United States Patent
Merrells

(10) Patent No.: US 8,756,194 B1
(45) Date of Patent: Jun. 17, 2014

(54) CLOUD-BASED DATA REPLICATION FOR WEB APPLICATIONS WITH REPLICA IDENTIFIER REASSIGNMENT FEATURE

(75) Inventor: John Merrells, Menlo Park, CA (US)

(73) Assignee: Sencha, Inc., Redwood City, CA (US)

( * ) Notice: Subject to any disclaimer, the term of this patent is extended or adjusted under 35 U.S.C. 154(b) by 226 days.

(21) Appl. No.: 13/464,875

(22) Filed: May 4, 2012

(51) Int. Cl.
*G06F 17/30* (2006.01)

(52) U.S. Cl.
USPC ............ 707/634; 707/614; 707/617; 707/624

(58) Field of Classification Search
CPC ................................................ G06F 17/30578
USPC .................................. 707/614, 617, 624, 634
See application file for complete search history.

(56) References Cited

U.S. PATENT DOCUMENTS

| | | | | |
|---|---|---|---|---|
| 5,812,793 | A * | 9/1998 | Shakib et al. ................. | 709/201 |
| 6,098,079 | A * | 8/2000 | Howard ................................ | 1/1 |
| 6,212,557 | B1 * | 4/2001 | Oran ............................. | 709/221 |
| 6,449,622 | B1 * | 9/2002 | LaRue et al. ........... | 707/999.008 |
| 6,542,907 | B1 * | 4/2003 | Cohen .................... | 707/999.203 |
| 6,973,463 | B2 | 12/2005 | Merrells et al. | |
| 7,016,976 | B2 | 3/2006 | Merrells et al. | |
| 7,096,236 | B2 | 8/2006 | Good et al. | |
| 7,756,825 | B2 * | 7/2010 | Khosravy et al. ............. | 707/611 |
| 8,046,424 | B2 * | 10/2011 | Novik et al. .................. | 709/216 |
| 8,121,990 | B1 * | 2/2012 | Chapweske et al. .......... | 707/695 |
| 2001/0038648 | A1 * | 11/2001 | Sutton et al. .................. | 370/535 |
| 2002/0184230 | A1 | 12/2002 | Merrells et al. | |
| 2003/0088587 | A1 | 5/2003 | Merrells et al. | |
| 2003/0088589 | A1 | 5/2003 | Good et al. | |
| 2003/0088615 | A1 | 5/2003 | Good et al. | |
| 2003/0088656 | A1 | 5/2003 | Wahl et al. | |
| 2003/0093440 | A1 | 5/2003 | Merrells et al. | |
| 2008/0140732 | A1 * | 6/2008 | Wilson et al. .................. | 707/201 |
| 2008/0222193 | A1 * | 9/2008 | Reid .............................. | 707/102 |
| 2010/0063959 | A1 * | 3/2010 | Doshi et al. ................... | 707/618 |
| 2010/0082536 | A1 * | 4/2010 | Cosic ............................ | 707/610 |
| 2010/0088273 | A1 * | 4/2010 | Donaldson .................... | 707/609 |
| 2010/0094817 | A1 * | 4/2010 | Ben-Shaul et al. ........... | 707/697 |
| 2010/0161948 | A1 * | 6/2010 | Abdallah ....................... | 712/228 |
| 2010/0169272 | A1 * | 7/2010 | Labatte et al. ................ | 707/608 |
| 2010/0228702 | A1 * | 9/2010 | Davis et al. ................... | 707/691 |
| 2011/0258160 | A1 * | 10/2011 | Lee et al. ...................... | 707/626 |
| 2011/0320400 | A1 * | 12/2011 | Namini ......................... | 707/610 |
| 2012/0005159 | A1 * | 1/2012 | Wang et al. ................... | 707/617 |

OTHER PUBLICATIONS

Yasushi Saito & Marc Shapiro, "Optimistic Replication", Mar. 2005, ACM Computing Surveys, vol. 37, No. 1, pp. 42-81.*

* cited by examiner

*Primary Examiner* — Rehana Perveen
*Assistant Examiner* — Scott A Waldron
(74) *Attorney, Agent, or Firm* — Hickman Palermo Truong Becker Bingham Wong LLP; Adam C. Stone

(57) ABSTRACT

A multi-master cloud-based data replication service designed to support the needs of a broad class of web applications is disclosed. Generally, the replication service serves the purposes of facilitating sharing of web application data among personal computing devices and increasing the availability of that data. In one embodiment, the replication service includes a replica identifier reassignment features that allows a personal computing device to begin sharing application data changes with an existing group of personal computing devices that are already sharing application data changes between them even if the joining personal computing device has application data changes to share with the other personal computing devices of the group at the time the joining personal computing device requests to join the group.

29 Claims, 7 Drawing Sheets

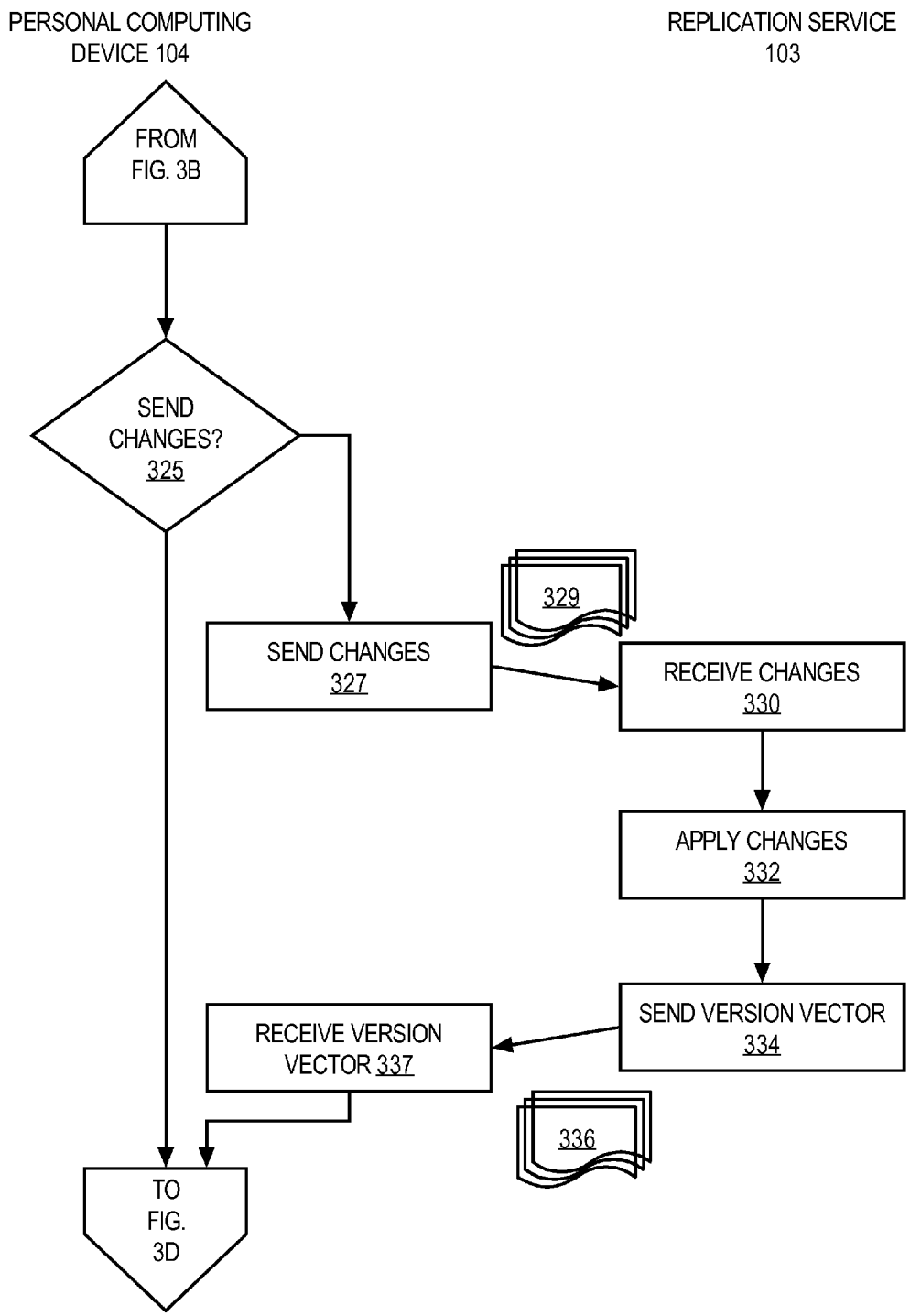

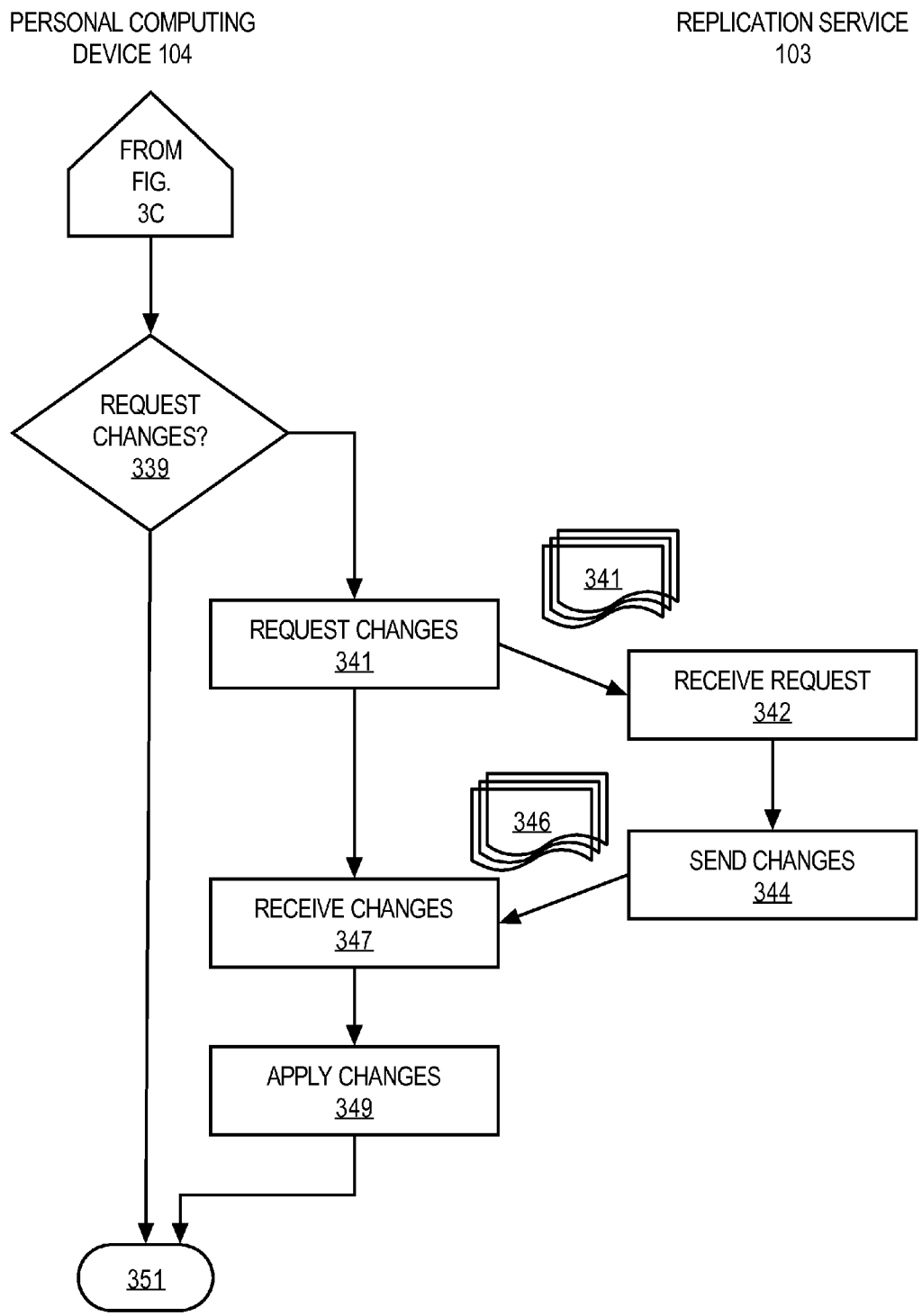

CLOUD-BASED DATA REPLICATION FOR WEB APPLICATIONS WITH REPLICA IDENTIFIER REASSIGNMENT FEATURE

COPYRIGHT STATEMENT

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates generally to data replication in distributed computing systems. More specifically, the invention relates to cloud-based data replication for web applications.

BACKGROUND

In recent years, personal computing has become more global and more mobile. The widespread adoption of portable personal computing devices such as laptops, Personal Data Assistants (PDAs), tablet computers, music players, and cell phones allow users to access to their personal data virtually anywhere and at anytime. A user flying on a plane to New York can access e-mail stored on a server in San Francisco. A shopper strolling through a shopping center can be electronically offered a personalized discount from a retailer. Friends in disparate geographic locations can instantly share digital photos and text messages with each other.

At the same time, with the increasing computing power of personal computing devices and the wide availability of wired and wireless broadband Internet connections, more and more web application functionality is now being executed by end-user devices. This shift in processing from server to client is being facilitated by the ubiquity of web browser software that supports Internet standards such ECMAScript, Hypertext Markup Language (HTML), Cascading Style Sheets (CSS), Extensible Markup Language (XML), and other standards.

As more and more web application functionality moves from server to client, a whole new set of challenges face web application developers: previously server-centric web applications are now distributed between servers and many clients. A particular set of challenges involves sharing data that a web application stores on an end-user device with other end-user devices. Sharing web application data among end-user devices is especially challenging because many personal computing devices, especially portable wireless devices, operate in semi-connected computing environments.

In a typical distributed computing system, powerful computers are interconnected by fixed, robust network infrastructure. In contrast, in semi-connected computing environments, portable devices with relatively limited processing, storage, and power capabilities access other devices over intermittent, low-bandwidth, high-latency network connections. Although wireless networks are being deployed at a rapid pace, ubiquitous highly-available, high-bandwidth, low-latency network connectivity remains elusive. Thus, web applications should be accommodating of intermittent and generally low-bandwidth, high-latency connectivity between end-user devices and servers. Further, web applications should limit computation and network communication to the extent possible to conserve battery life of the portable devices on which they execute.

Also, web applications should aim to limit the amount of metadata they require to store on personal computing devices, where data storage space may be limited.

Web applications should also aim to limit the amount of metadata they require to send over the network, where connectivity may be weak. Further, for battery-powered devices generally, the less network communication and the less amount of data communicated over the network, the less battery power used.

Given the need for sharing web application data among end-user devices, developers of web applications and end-users of web applications would appreciate solutions for more easily, reliably, and efficiently sharing application data among personal computing devices.

OVERVIEW OF EMBODIMENTS OF THE PRESENT INVENTION

A multi-master cloud-based data replication service designed to support the needs of a broad class of web applications is disclosed. As used herein, the term "cloud-based" service generally refers to a service available on a data network, typically, but not limited to, the Internet and invokeable over the data network in accordance with a networking protocol, typically, but not limited to, an Internet suite protocol (e.g., Transmission Control Protocol/Internet Protocol (TCP/IP)). An embodiment of the invention is provided as part of a new multi-master cloud-based data replication service offered by Sencha, Inc. of Redwood Shores, Calif. called Sencha.io Sync.

Generally, the replication service serves the purposes of facilitating sharing of web application data among personal computing devices and increasing the availability of that data. For example, the replication service facilitates a user creating or updating a contact list stored on a mobile phone while the user is flying in an airplane and disconnected from a data network and later sharing the new contact list or updates to the contact list with the user's laptop computer or another user's personal computing device when network connectivity becomes available. As another example, the replication service allows the user recover the contact list to the mobile phone if data stored on the mobile phone is deleted or recover the contact list to another personal computing device if the mobile phone is lost.

Before continuing with the overview of aspects of the replication service, some useful definitions will now be provided.

As used in this description, the term "personal computing device" refers broadly to any computing device capable of being operated by a user and capable of operatively coupling to a data network. Non-limiting examples of personal computing devices include stationary computing devices such as workstation computers, desktop computers, gaming computers, and single unit or all-in-one computers; mobile computing devices such as laptop computers, tablet computers, cell phones, and smart phones; networked smart appliances such as home theatre devices, television sets, or any other appliance with networking and data processing capabilities; and any other networked or networking-capable computing device capable of being operated by a user.

As used herein, the term "web application data", or just "application data", refers broadly and generally to any data that a web application stores on the personal computing device on which the web application executes. Web application data includes, but is not limited to, data provided to a web application by a user of the web application, web application metadata, or any other data that a web application may need to persist to carry out its function.

As used herein, the term "web application" refers broadly and generally to any set of instructions designed to perform a specific task or tasks in a web browser or similar application. Typically, but not required, the set of instructions include markup language instructions (e.g., Hypertext Markup Language (HTML)), style sheet language instructions (e.g., Cascading Style Sheets (CSS)), and browser scripting language instructions (e.g., JavaScript)).

As used herein, the term "web browser" or just "browser" refers broadly and generally to any computing application for retrieving, presenting, and traversing information resources on a data network. Typically, but not required, an information resource is located by a Uniform Resource Locator (URL) or other Internet address.

These definitions and the other definitions of terms herein and not meant to be exclusive of any meaning one skilled in the art would ascribe to the defined terms that is not inconsistent with the definitions herein.

Continuing now with the overview of aspects of the replication service, the replication service facilitates collaborative web applications in which application data changes are replicated between multiple personal computing devices in near real-time. As just one example, a collaborative crossword gaming web application, for example, can be developed that allows multiple users to work on the same crossword in parallel. As one user enters a letter into the crossword using his or her personal computing device, data representing the entered letter may be replicated to other users' personal computing devices such that the letter appears in the other users' views of the crossword in near real-time. This is just one example of a collaborative web application that may be developed with the replication service.

The replication service may be characterized as join anytime. Join anytime means that a personal computing device can begin sharing application data changes with an existing group of personal computing devices that are already sharing application data changes between them even if the joining personal computing device has application data changes to share with the other personal computing devices of the group at the time the joining personal computing device requests to join the group. The replication service implements a replication protocol that allows the joining personal computing device to join the existing group including sharing the joining device's existing application data changes with the other personal computing devices of the group without loss of non-conflicting application data changes. For example, a user can create a first version of a contact list on his or her mobile phone and create a second version of the contact list on his or her laptop computer. The two versions of the contact list can be synchronized with each other through the replication service without loss of non-conflicting application data changes regardless of which of the two devices initiates a replication exchange with the replication service last.

The replication protocol may be characterized as an incremental replication protocol. Incremental replication protocol means that personal computing devices and the replication service maintain and exchange a summary of the application data changes they already "know" about through previous application data changes and previous replication exchanges. The personal computing devices and the replication service use the summaries to determine which application data changes need to be shared during a replication exchange. In some embodiments, the summary is maintained and exchanged in the form of a per-replica version vector.

The replication protocol may also be characterized as stated-based. State-based means that the replication service and the personal computing devices send application data changes from their replicas of a shared data store, rather than the sequence of operations that produced those changes.

As used herein, the term "shared data store" refers generally to a logical collection of web application data that is replicated among replicas of the shared data store. The replication protocol provides eventual consistency between replicas of a shared data store. Therefore, at any given time, the application data of one replica of a shared data store may be different from the application data of another replica of the shared data store.

As used herein, the term "replica" refers generally to a copy of a shared data store. The copy may be persisted on a non-volatile or volatile data storage medium, or any other data storage medium of, or operatively coupled to, a personal computing device or the replication service.

Because of the state-based design of the replication protocol, the replication protocol does not require an operation log to be maintained at personal computing devices. The lack of a requirement for an operation log is especially beneficial to web applications that execute on personal computing devices that provide a limited amount of data storage space to the web applications. In these situations, a requirement to maintain an operation log could be prohibitive if the size of the operation log must be allowed to grow to a certain size (e.g., to a significant percentage of the total amount of data storage space available to the web application).

Another feature of the replication protocol is that it supports disconnected updates. A personal computing device can make application data changes to a replica when offline and still replicate those changes through the replication service to other personal computing devices at a later time when network connectivity is available.

Another feature of the replication protocol is that it relies on a reduced amount of metadata used to coordinate the replication process that is stored in replicas and sent over the data network during a replication exchange. In general, the amount of replication metadata stored in replicas and sent over the data network during replication exchanges is proportional to the size of the shared data store, as opposed to the number or frequency of application data changes to replicas.

Another feature of the replication protocol is that it is capable of detecting concurrent application data changes and automatically resolving concurrency conflicts. In some embodiments, for example, concurrency conflicts are automatically resolved under a last writer wins policy. In some embodiments of the invention, all detected concurrency conflicts are resolved automatically. By resolving all concurrency conflicts automatically, there is no need to maintain version histories of application data changes, thereby reducing the amount of versioning metadata that needs to be stored in replicas.

Other aspects and advantages of the present invention can be seen upon review of the figures, the specification, and the claims which follow.

BRIEF DESCRIPTION OF THE DRAWINGS

The present invention is depicted by way of example, and not by way of limitation, in the figures of the accompanying drawings and in which like reference numerals refer to similar elements and in which:

FIGS. 3A-D (collectively FIG. 3) is a flowchart of a replication exchange protocol for joining a new device replica to a shared data store, according to some embodiments of the invention.

DETAILED DESCRIPTION OF EMBODIMENTS

In the above overview and the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the above overview and following description, for the purpose of explanation, various actions are described as being performed by a "web application, a "personal computing device", and a "replication service". Some of these actions may be caused to be performed, directly or indirectly, by one or more computing devices as a result of one or more computing devices executing software instructions. Alternatively, some of these actions may be may be caused to be performed, directly or indirectly, by one or more computing devices using any number of hardware devices (e.g., a programmable logic array, an ASIC, etc.) with elements, including logic elements, which are constructed/configured to carry out or cause the actions.

Exemplary Network Environment

Figure 1:
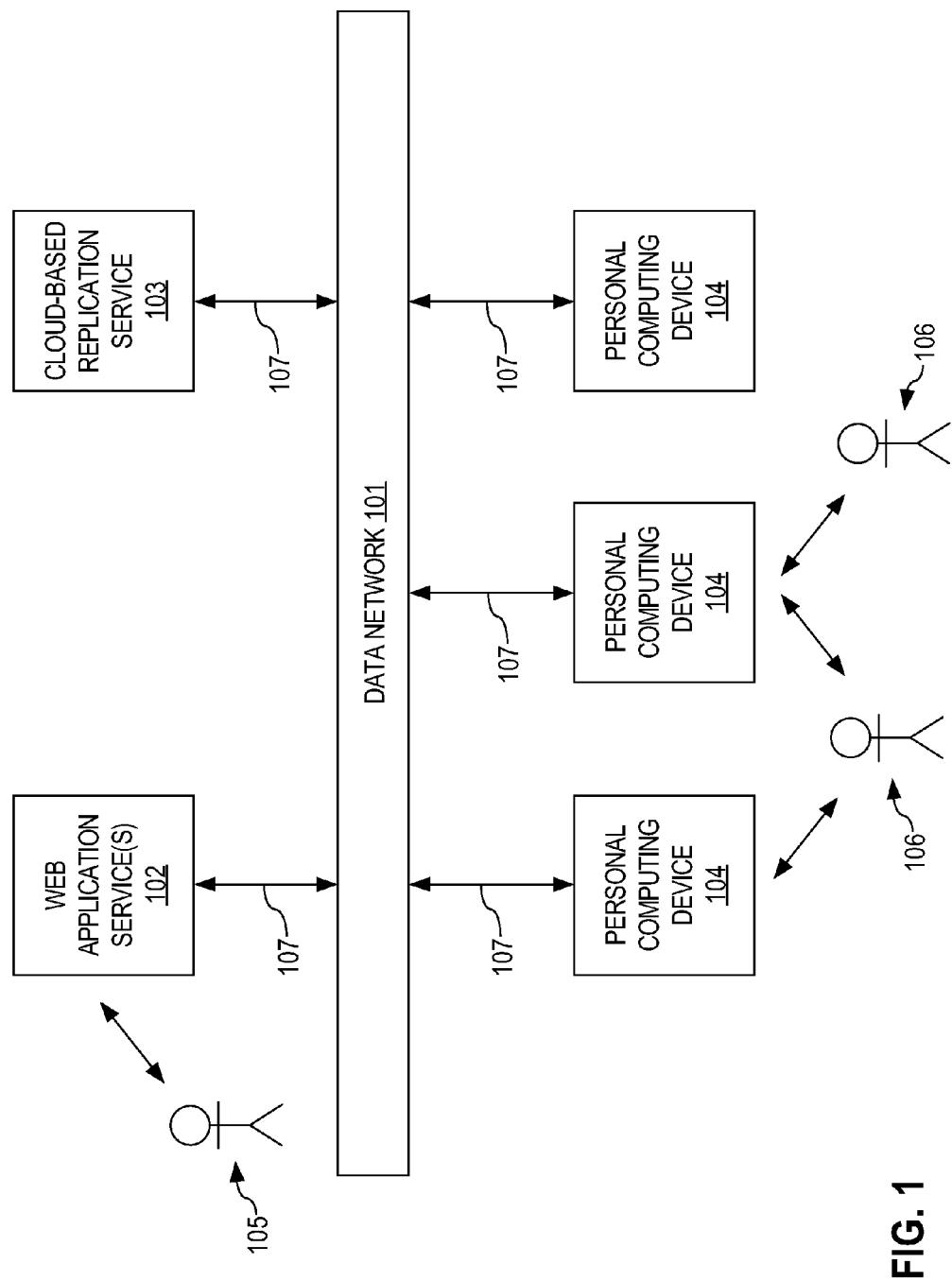
FIG. 1 is a block diagram of an exemplary networking environment in which some embodiments of the present invention may be implemented.

FIG. 1 is a block diagram of a network environment in which the cloud-based replication service of the present invention may be implemented, according to some embodiments of the invention.

The network environment includes a data network 101, one or more web application services 102, the cloud-based replication service 103, and personal computing devices 104. The network environment may also include a web application developer or developers 105 or a team or teams of web application developers 105 responsible for development and deployment of web applications. The network environment may also include end-users 106 of personal computing devices 104 and web applications.

Web application services 102, cloud-based replication server 103, and personal computing devices 104 are operatively coupled to a data network 101 by communication links 107. In one embodiment, the data network 101 is the Internet. However, data network 101 may be any system of interconnected computer networks or collection of hardware components and computers interconnected by communication channels that allows sharing of resources and information. Data and information sent and received over communication links 107 may be sent and received using any reliable transport protocol such as, for example, Transmission Control Protocol/Internet Protocol (TCP/IP). Other protocols may be used in addition to a reliable transport protocol such as, for example, an application-level protocol such as, for example, the Hypertext Transfer Protocol (HTTP). Other reliable transport protocols and application level protocols may be used in addition to or instead of TCP/IP and HTTP and the invention is not limited to TCP/IP or HTTP.

A network communication link 107 between a personal computing device 104 and the data network 101 may be weak in that the link 107 is low-bandwidth and high-latency. From time to time, a personal computing device 104 may be disconnected if it cannot currently establish a network communication link 107 to the data network 101. Thus, a personal computing device 104 may experience intermittent connectivity characterized by alternating periods in which it can connect to the data network 101 and cannot connect to the data network 101. According to some embodiments, the replication protocol of the present invention is designed to be tolerant of weak or intermittent network connectivity between personal computing devices 104 and the replication service 103.

Web application services 102 generally represent any server-side web application functionality including, but not limited to, serving, to personal computing devices 104, web content such as web pages (e.g., HTML, XHTML, CSS, JavaScript, XML, etc.), images, video, audio, and the like. Web application services 102 provide web applications for access over the data network 101 by personal computing devices 104, typically, but not required, at a known Uniform Resource Locator (URL) or other Internet address.

A web application provided by a web application service 102 may have a client-side component executed by personal computing devices 104 and a server-side component as part of the web application service 102. The client-side component may be downloaded by a personal computing device 104 from the web application service 102 for execution by the personal computing device 104. Typically, but not required, the client-side component is executed by a web browser or similar software installed on the personal computing device 104. The client-side component may be based on, but is not required to be based on, widely supported Internet standards such as HTML, CSS, XML, JavaScript, or others.

In some embodiments of the invention, the client-side component of a web application includes a module, library, or sub-component that implements the replication protocol for replicating web application data changes with replication service 103 and other personal computing devices 104.

In one exemplary embodiment of the present invention, the client-side component of a web application includes a JavaScript library that implements the replication protocol for replicating web application data changes with a new multi-master cloud-based data replication service offered by Sencha, Inc. of Redwood Shores, Calif. called Sencha.io Sync.

The replication service 103 implements the replication protocol for replicating web application data changes with personal computing devices 104. The replication service 103 may be implemented as one or more computing processes or threads executing on one or more computing devices such as, for example, one or more computing devices hosted in a data center or other computing facility.

The replication service 103 may or may not be affiliated with web application services 102. Thus, the servers or computing devices hosting web application services 102 may be separate from the servers or computing devices hosting the replication service 103. Further, the servers or computing devices hosting web application services 102 may be owned and operated by a different authority or entity than the servers or computing devices hosting the replication service 103.

In operation, personal computing devices 104 periodically establish a communication link 107 to the replication service 103 to initiate a replication exchange with the replication service 103. A purpose of the replication exchange is to synchronize a replica of a shared data store maintained by a personal computing device 104 with a replica of the shared data store maintained by the replication service 103. Thus, a replication exchange occurs in the context of a particular shared data store.

For clarity of explanation and ease of understanding, a replica of a shared data store maintained by a personal computing device 104 will be referred to hereinafter as a "device replica". A replica of the shared data store maintained by the replication service 103 will be referred to hereinafter as a "service replica". The term "replica" by itself, without the "device" or "service" qualifier, is used herein to refer to both device replicas and service replicas generally.

A personal computing device 104 can maintain multiple device replicas. For example, a personal computing device 104 can execute multiple web applications that each separately maintains their own device replica. Alternatively or in addition, a single web application executing on the personal computing device 104 may maintain multiple device replicas.

Generally and in one aspect, a replication exchange between a personal computing device 104 and the replication service 103 involves sending, from the personal computing device 104 to the replication service 103, application data changes made to a device replica that the service replica does not know about and sending, from the replication service 103 to the personal computing device 104, application data changes made to the service replica that the device replica does not know about. The application data changes made to the service replica that the device replica does not know about can include application data changes made to other device replicas by other personal computing devices 104 that have successfully completed a replication exchange to with the replication service 103. Thus, by completing a replication exchange with the replication service 103, a personal computing device 104 can learn about and incorporate into its device replica, application data changes made to the shared data store by other personal computing devices 104.

Also, a replication exchange between a personal computing device 104 and the replication service 103 can include concurrency conflict detection and conflict resolution. A concurrency conflict arises when the same application data is changed "in parallel" in two replicas. In the context of concurrency conflicts, "in parallel" means that the application data is changed in one replica without knowledge of the change to the application data item in another replica and vice versa.

Overview of Device Replica Identifier Reassignment

A first replication exchange between a personal computing device 104 and the replication service 103 can include device replica identifier reassignment. Device replica identifier reassignment facilitates the join anytime feature of the replication service and replication protocol. Device replica identifier reassignment allows new device replicas to be created, and application data changes made to the new device replica, in disconnected networked environments and without communication or coordination with other personal computing devices 104 or the replication service 103. In particular, a personal computing device 104 can create a new device replica, make application data changes to the new device replica, and then initiate the first replication exchange with the replication service 103 to synchronize the new device replica with the service replica without loss of the non-conflicting application data changes that were made to the new device replica before the first replication exchange was initiated. Significantly, prior to initiating the first replication exchange with the replication service 103, the personal computing device 104 need not have any network connectivity to the replication service 103 or another personal computing device 104 for coordinating creation of the new device replica or for coordinating application data changes to the new device replica prior to the first replication exchange. The personal computing device 104 can join the new device replica to an existing group of replicas of an existing shared data store even if the new device replica is non-empty (i.e., has application data changes) at the time of joining. Non-conflicting application data changes to the new device replica may be incorporated into the existed shared data store as part of the first replication exchange. Conflicting application data changes may be incorporated depending on the outcome of conflict resolution.

Device replica identifier reassignment is described in greater detail below with respect to FIG. 3. However, a general overview of device replica identifier reassignment will now be provided, according to some embodiments of the invention.

Initially, a personal computing device 104 creates a new device replica. For example, a web application executing on the personal computing device 104 may create the new device replica. When creating the new device replica, the personal computing device 104 assigns the new device replica an initial replica identifier, which may or may not become the device replica's final identifier. The initial replica identifier assigned by the web application need not be unique. Thus, the data used to represent the initial replica identifier can be minimal. For example, the initial replica identifier can be the number 0, some other small ordinal number, or other short identifier that requires a relatively small number of bytes to represent. This is contrast to other replication schemes that assign replicas a Globally Unique Identifier (GUID), Universally Unique Identifier (UUID), or other identifier that is practically or probabilistically unique across time and space.

The initial replica identifier is used by the personal computing device 104 for versioning application data changes to the device replica until the personal computing device 104 initiates the first replication exchange with the replication service 103. More particularly, whenever an application data change is made to the device replica by the personal computing device 104, the change is assigned a version in the form of a change stamp and an update timestamp. The change stamp includes a replica identifier along with a replica-specific counter. The change stamps and update timestamps are stored in the device replica as metadata and are used to coordinate replication exchanges. In one embodiment of the invention, the update timestamp is a time in seconds since an epoch.

Prior to initiating the first replication exchange with the replication service 103, the personal computing device 104 includes the initial replica identifier in change stamps assigned to application data changes. Beneficially, since the number of bytes needed to represent the initial replica identifier is relatively small, the change stamps stored in the device replica consume relatively less storage space when compared to GUIDs and UUIDs which can require 16 bytes to represent or more.

As an initial step of the first replication exchange, the device replica is assigned a final replica identifier by the replication service 103. The final replica identifier is used by the personal computing device 104 for versioning all application data changes to the device replica including application data changes that were already made to the device replica at the time the first replication exchange was initiated. The final replica identifier may be the same as the initial replica identifier or a different replica identifier assigned by the replication service. 103. Further, like the initial replica identifier, the final replica identifier need not be practically or probabilistically unique across time and space. The final replica identifier need only be unique among all replica identifiers of all replicas of the shared data store. Thus, like the initial replica identifier, the final replica identifier can also be a small ordinal number or other identifier that requires a relatively small number of bytes to represent. Thus, like initial replica identifiers, final replica identifiers consume relatively small amounts of data storage space and network bandwidth when compared to GUIDs, UUIDS, and other globally unique identifiers.

As mentioned above, the final replica identifier may be the same as the initial replica identifier or a different replica identifier assigned by the replication service 103. If, during the first replication exchange, the replication service 103 determines that the initial replica identifier assigned to the device replica is already being used as a replica identifier for another replica of the shared data store, then the replication service 103 determines a new final replica identifier for the device replica that does not conflict with any of the existing device replica identifiers for the shared data store that are already in use. This assigned final replica identifier is communicated during the first replication exchange to the personal computing device 104 which, upon receiving the final replica identifier, replaces (reassigns) all initial replica identifiers with the final replica identifier in all existing change stamps stored in the device replica. Thereafter, the personal computing device 104 uses the final replica identifier in all change stamps assigned to future application data changes.

If, on the other hand, during the first replication exchange, the replication service 103 determines that the initial replica identifier assigned to the device replica by the personal computing device 104 is not already assigned to another replica of the shared data store, then the personal computing device 104 can use the initial replica identifier as the final replica identifier for the device replica without having to the replace replica identifiers in existing change stamps stored in the device replica. Thus, reassignment of change stamps need occur only when the initial replica identifier is already being used to identify another replica of the shared data store. In either case, whether the initial replica identifier is the same or different from the final replica identifier, the personal computing device 104 and the replication service 103 complete the replication exchange to synchronize the device replica with the service replica using the final replica identifier.

Shared Data Store

Figure 2:
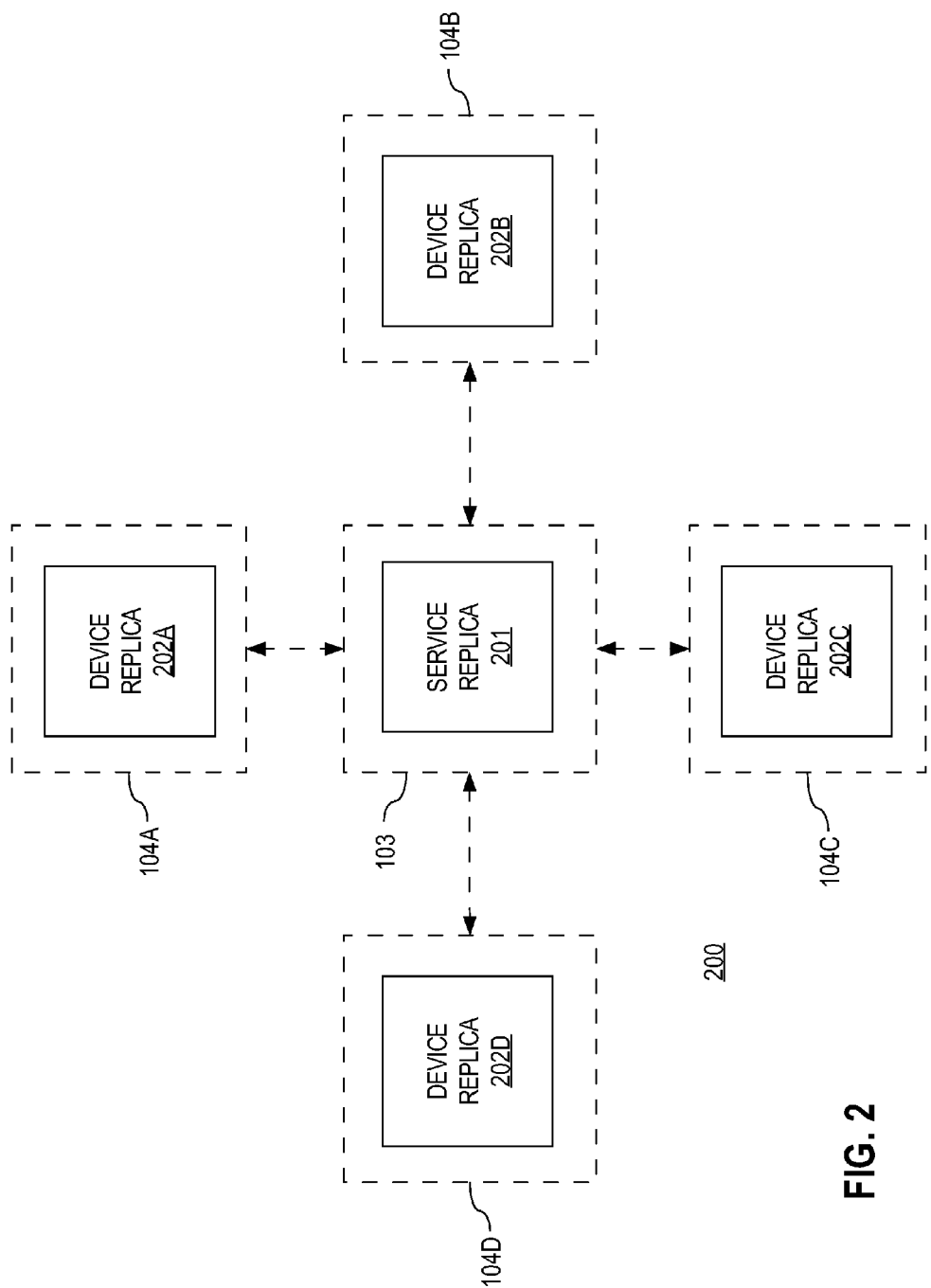
FIG. 2 is a block diagram of an exemplary shared data store, according to some embodiments of the invention.

FIG. 2 is a block diagram of an exemplary shared data store 200 according to some embodiments of the invention. The shared data store 200 is a logical collection of application data objects that are replicated among replicas 201, 202A, 202B, 202C, and 202D of the shared data store 200. Replica 201 is a service replica of the shared data store 200 maintained by the replication service 103. Replicas 202A-D are device replicas of the shared data store 200. Each device replica 202A-D is separately maintained by personal computing devices 104A-D, respectively.

In other embodiments, the shared data store 200 may contain more or less replicas than the number of replicas shown in FIG. 2. For example, shared data store 200 may contain as few as one device replica 202, more than four device replicas 202, or more than one service replica 201.

In one embodiment of the invention, a shared data store 200 contains more than one service replica 201. In one embodiment of the invention, when a shared data store 200 contains multiple service replicas 201, one of the service replicas 201 is elected as a leader and the leader is responsible for assigning all final replica identifiers. In one embodiment of the invention, a service replica 201 can join an existing shared data store 200 by initiating a replication exchange with an existing service replica 201 of the shared data store 200 in the same way described herein that a device replica 202 can join an existing shared data store 200. The joining service replica 201 may be assigned a new replica identifier as a result of joining the shared data store 200 and any device replicas 202 that were conducting replication exchanges with the joining service replica 202 may be assigned new replica identifiers at the next replication exchange with the joining service replica 201 after the joining service replica 202 has joined the shared data store 200.

The shared data store 200 is associated with a unique identifier that uniquely identifies it from other shared data stores 200. The data store identifier may be a GUID, a UUID, a change stamp, any sequence of characters or bytes, or set of data that uniquely identifies a shared data store 200 from another data store 200.

The shared data store 200 may be used by a single user, a group of users, a single web application, a group of web applications, or some combination users and web applications. How many users and how many web applications use a shared data store 200 may vary according to requirements of the particular implementation at hand. It should be understood that the present invention is not limited to any particular combination of users and web applications that use a shared data store 200. For example, all users of a web application may use the same shared data store 200. Alternatively, each user of a web application may use a separate shared data store 200. Other combinations users and web applications are possible and all such combinations are within the scope of the present invention.

Shared Data Store Schema

The replicas 201 and 202 of the shared data store 200 adhere to a known data schema. However, no particular schema is required. The particular schema of the shared data store 200 can vary according to requirements of the particular implementation at hand. For purposes of explaining the replication protocol in concrete terms, the replication protocol is explained below in terms of "data objects" and "attributes".

In some embodiments of the invention, the shared data store 200 is centered on the notion of a data object. At the highest level of abstraction, a data object is a container for information representing things in the world. For example, a data object can represent an entity such as a person, a place, an organization, or other noun. A data object can represent an event that happens at a point in time or for a duration. A data object can represent a document or other unstructured data source such as an e-mail message, a news report, a written paper or article, a digital photograph, a song, etc. Each data object may also have a type (e.g., Person, Event, or Document) and a display name which may be the value of a particular attribute of the data object. A data object may be typed, for example, according to a fixed, dynamic, or user-defined type hierarchy or other type classification system.

In some embodiments, a data object is made up of one or more attributes. Each attribute may have a name and a value. An attribute may be typed as one of a set of supported primitive types (e.g., string or Integer), or according to a fixed, dynamic, or user-defined type hierarchy or other type classification system.

Personal computing devices 104 add new data objects to the shared data store 200 by creating data objects in a device replica 202. A data object is associated with a unique identifier (e.g., a GUID, UUID, a change stamp, etc.) that uniquely identifies the data object within the shared data store 200. For example, a data object may be assigned a unique identifier by a personal computing device 104 at the time of its creation.

Attributes of a data object may also be associated with unique identifiers. The unique identifier of an attribute may be, though need not be, derived from the containing data object's unique identifier. Data object identifiers and attribute identifiers allow personal computing devices 104 and the replication service 103 to refer to shared data objects and attributes during replication exchanges. A personal computing device 104 may perform other operations on a device replica 202 such as reading, updating, and deleting data objects and creating, reading, updating, and deleting attributes.

Replicated data objects and attributes of the shared data store 200 can be read, updated, and deleted by any personal computing device 104 storing a device replica 202 of the shared data store 200. A personal computing device 104 can perform operations on a device replica 202 without coordination with the replication service 103 or other personal computing devices 104. Updated data objects of a device replica 202 eventually propagate to all other device replicas 202 of the shared data store 200 via replication exchanges with a service replica 201 of the shared data store 200 in accordance with the replication protocol.

Because personal computing devices 104 may make application data changes to device replicas 202 independently of each other, it is possible they make conflicting data changes. This type of conflict is referred to herein as a concurrency conflict. A concurrency conflict arises when the same change unit is updated in parallel at two device replicas 202. Detection and resolution of concurrency conflicts is described in greater detail below.

While this description uses the terms "data object" and "attribute" when referring to the schema of the shared data store 200. These terms are not intended to refer to any particular data object or particular type of data object or any particular attribute or type of attribute. A data object or an attribute may be known to those skilled in the art by different names. For example, a data object may also be referred to by one skilled in the art as a data item, a data record, or a data entity, as just some examples. Similarly, an attribute may also be referred to by one skilled in the art as a property or a field, as just some examples.

Synchronization Schedules

A personal computing device 104 can initiate a replication exchange with the replication service 103 according to a synchronization schedule. The schedule may vary depending on the requirements of the particular implement at hand. Some possibilities are: at regular intervals or upon command of a web application executing on the personal computing device 104. Further, a personal computing device synchronization schedule can be adaptive or change over time depending on detected application conditions, device conditions, network conditions, or other operating conditions. For example, a cell phone device 104 that has wireless network capabilities, when connected to the replication service 103 via a high-speed wireless network, may frequently initiate a replication exchange with the replication service 103 to achieve a higher degree of application data consistency. In contrast, the same cell phone device 104, when connected to the replication service 103 via a lower-speed cellular network, may initiate a replication exchange less frequently than when connected via the high-speed network. The replication protocol disclosed herein is designed to be accommodating of a variety of difference synchronization schedules. The replication protocol of the present invention is not limited to any particular synchronization schedule.

Change Units

Each data object is made up of one or more non-overlapping change units. A "change unit" represents the granularity of updates sent during a replication exchange as well as a basic unit of versioning and concurrency conflict detection and resolution. Change units can be as small as the individual attributes of a data object, such as a person's name or e-mail address, or as large as the whole data object depending on the requirements of the particular implementation at hand. Each change unit may have a unique (unique within a shared data store 200) identifier (which may be a GUID, a UUID, a change stamp or other identifier that is unique at least within the shared data store 200).

Change Stamps

According to some embodiments of the replication protocol, whenever a change unit is created or modified in a replica 201 or 202, it is assigned a new change stamp that represents the new version of the change unit in the replica. The change stamp associated with the change unit includes an identifier of the replica in which the change unit is stored along with a replica-specific counter that is incremented on each change to any data object of the replica.

As mentioned above, the replica identifier of the change stamp can be an initial replica identifier, if the replica is a device replica 202 that has not yet been joined to the shared data store 202 by successfully completing a first replication exchange with the replication service 103, or it can be a final replica identifier, if the device replica 202 has already been joined to the shared data store 200.

Assigned change stamps may be stored in a replica 201 and 202 in association with the change units they version. As a change unit is updated in the replica over time, it is associated with different change stamps while maintaining the same unique identifier(s). In some embodiments, a replica stores only the latest change stamp associated with a change unit. Thus, maintaining a version history or a history of change stamps for a change unit is not necessary. To facilitate this, the replication protocol automatically resolves all detected concurrency conflicts according to a concurrency conflict resolution heuristic. Since all concurrency conflicts are automatically resolved by the replication protocol, there is no need to maintain a version history in replicas for facilitating manual conflict resolution.

One example of a concurrency conflict resolution heuristic is "last writer wins". Last writer wins means that when two versions of the same change unit concurrently conflict, the oldest version in time is discarded in favor the newer version in time. To facilitate the last writer wins heuristic, each change unit in a replica is associated with an update timestamp that indicates the time the change unit was last changed. Update timestamps can be compared to determine which of two versions of the same change unit is older in time and which is newer in time.

The update timestamp may be a component of the replica-specific counter portion of the change stamp assigned to the change unit. For example, the replica-specific counter portion of a change stamp may be generated by obtaining a time since an epoch from a computer system clock. Alternatively, the update timestamp may be separate metadata from the change stamp assigned to the change unit. Whether separate metadata or part of the change stamp, the update timestamp may be generated by obtaining a time since an epoch from a computer system clock.

To avoid identical change stamps being assigned to different replica changes, a per-replica looping counter value can be appended to the obtained time value. The looping counter may have an ordinal range that starts at an initial ordinal and ending at a maximum ordinal that is greater than the initial ordinal. When the looping counter reaches the maximum ordinal, the counter starts again at the initial ordinal at the next increment of the counter. The range of the looping counter can vary depending on the smallest increment of time that the obtained time value represents and the expected upper bound frequency of application data changes to the replica. For example, if the smallest increment of time represented by the obtained time value is a second and it is expected that the rate of application data changes to a replica will not exceed 256 application data changes per second, then the looping counter can range, for example, from 0 to 255.

As described above, instead of having the update timestamp be a component of the replica-specific counter portion of the change stamp assigned to the change unit, the update timestamp can be separate metadata associated with the change unit in the replica. In this case, appending a looping counter value to the update timestamp is not necessary. The replica-specific counter portion of the change stamp can be generated using an always increasing per-replica counter value that is incremented on each change to any data object of the replica.

In one embodiment, deletions are handled through the use of tombstones.

Replica Version Vectors

According to some embodiments, each replica 201 and 202 of a shared data store 200 is associated with a replica version vector that represents a summary of the replica's current knowledge of the shared data store 200. Each replica version vector may contain an entry for each replica 201 and 202 of the shared data store 200 indicating the latest change stamps generated for the replica of which the replica associated with the replica version vector is aware of, either through application data changes or replication exchanges.

A replica version vector may not contain an entry for a replica 201 or 202 of the shared data store 200 that has not changed any data objects of the shared data store 200, or, if the replica has changed a data object, of which the replica associated with the replica version vector has not yet acquired knowledge of through a replication exchange. Thus, when a personal computing device 104 creates a new device replica 202, the initial replica version vector associated with the new device replica can have no entries. When a personal computing device 104 makes a first change to a device replica 202, the change stamp assigned to the first change is added to the replica version vector, in the entry of the replica version vector for the replica. Thereafter, anytime the personal computing device 104 makes a change to the device replica 202, the entry in the replica version vector is updated with the change stamp assigned to the change. As the replica version vector is provided to the replication service 103 during a replication exchange, the replication service 103 can learn of a new device replica 202 by detecting the new entry in the version vector.

During a replication exchange between a device replica 202 and a service replica 201, the respective replica version vectors can be compared, according to known version vector arithmetic, to determine whether one replica stores at least one application data update that the other replica does not know about. In particular, one replica is up-to-date with respect the other replica if all change stamps in the replica's version vector is a superset of all change stamps in the other replica's version vector on an entry by entry basis. Specifically, for each entry in the other replica's version vector, the first replica's version vector should have a corresponding entry with an equal or greater change stamp. Otherwise, the replica is not up-to-date with respect to the other replica. As described in greater detail below, if the one replica is not up-to-date with respect to the other replica, then the replication exchange proceeds according to the replication protocol so that the one replica receives the application data changes it does not know about from the other replica.

Per-Change Unit Version Vectors

In addition to a replica version vector, each replica 201 and 202 of a shared data store 200 also stores a version vector for each change unit stored in the replica. During a replication exchange, when a replica 201 or 202 receives an application data change from another replica, change unit version vectors are compared, according to known version vector arithmetic, similar to the comparison between replica version vectors, to determine whether a change unit received from the other replica causally proceeds the version of the change unit stored in its replica and thus the received change unit can be ignored, causally follows its version and thus the received change unit should replace its version, or neither causally proceeds or causally follows thereby resulting in a concurrency conflict.

A version of a change unit CU from one replica R1 causally proceeds a version of the change unit CU from another replica R2, if the version vector associated with change unit CU in replica R1 is a subset of all change stamps in the version vector associated with change unit CU in replica R2 on an entry by entry basis. Specifically, for each entry in the version vector associated with change unit CU in replica R1, the version vector associated with change unit CU in replica R2 should have a corresponding entry with an equal or greater change stamp. In this case, the version of change unit CU in replica R2 can also be said to casually follow the version of change unit CU in replica R1.

The version of change unit CU from replica R1 causally follows the version of change unit CU from replica R2, if the version vector associated with change unit CU in replica R1 is a superset of all change stamps in the version vector associated with change unit CU in replica R2 on an entry by entry basis. Specifically, for each entry in the version vector associated with change unit CU in replica R1, the version vector associated with change unit CU in replica R2 should have a corresponding entry with an equal or greater change stamp.

If the version of change unit CU in replica R1 neither casually proceeds nor causally follows the version of change unit CU in replica R2, then a concurrently conflict has been detected.

Process for Joining a New Device Replica to a Shared Data Store

Figure 3A:
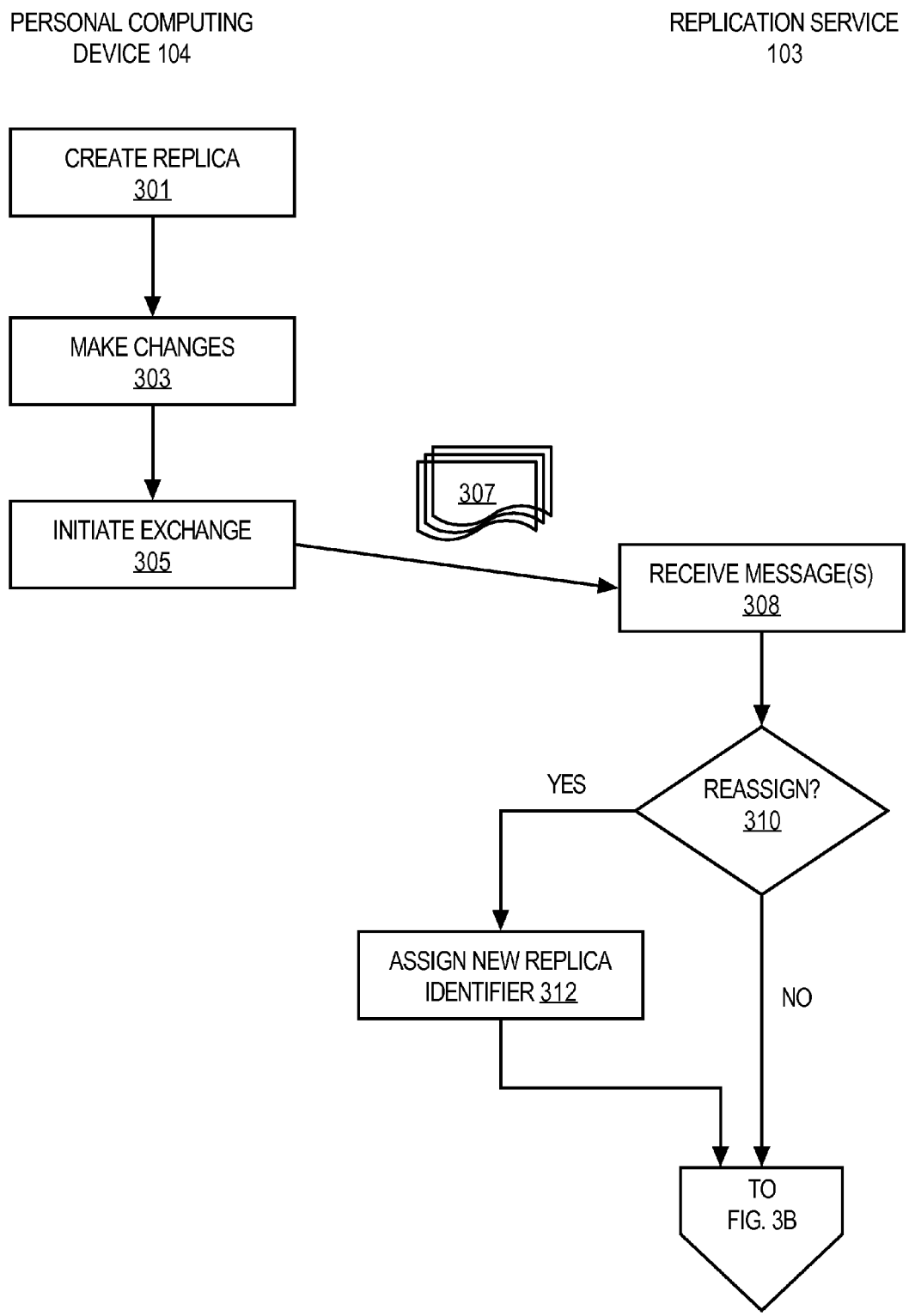
Figure 3B:
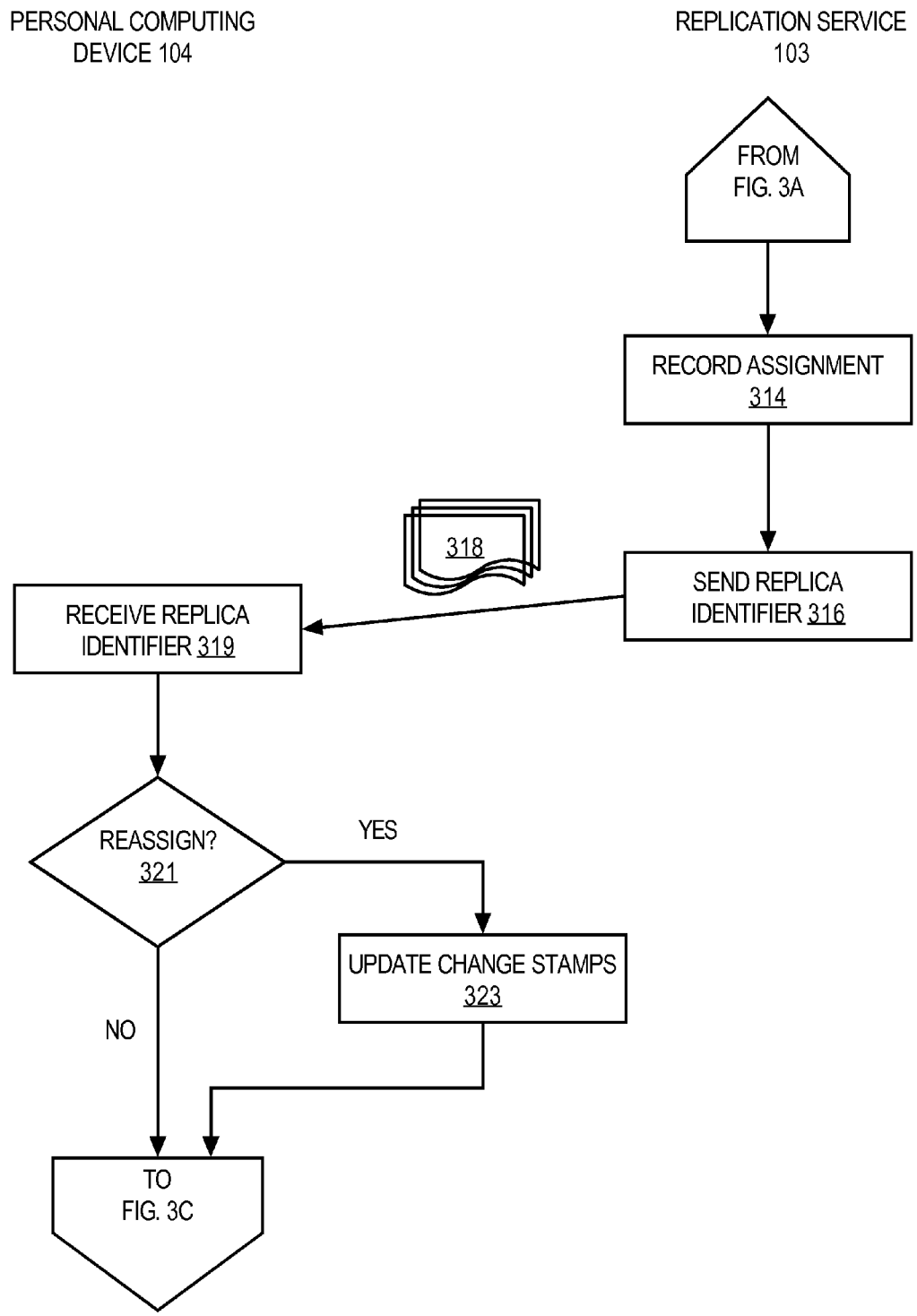

A replication exchange protocol for joining a new device replica 202 to a shared data store 200 will now be described with respect to the flowcharts of FIGS. 3A-D (collectively referred to herein as FIG. 3), according to an embodiment of the invention. As shown in FIG. 3, the exchange is initiated by a personal computing device 104 after creating the new device replica 202 and, optionally, making application data changes to it.

FIG. 3 is a flow diagram that depicts the steps and message sequencing of a replication exchange protocol for joining a new device replica 202 to a shared data store 200, according to an embodiment of the invention. The steps and network message sequences depicted are illustrative and particular implementations may include fewer or more steps in the same or a different order or configuration. While steps are indicated as being performed by the personal computing device 104 or the replication service 103, the steps indicated under one may be performed by the other. Similarly, while network messages are indicated as being sent or received by the personal computing device 104 or the replication service 103, messages sent or received by one may be sent or received by the other.

In one embodiment, the network messages are sent over a reliable network transport mechanism such as, for example, TCP/IP. The network messages themselves may be further packaged according to an application layer protocol (e.g., the Hypertext Transfer Protocol (HTTP), Secure Hypertext Transfer Protocol (HTTPS), etc.) and one or more data presentation formats (e.g., Extensible Markup Language (XML), Simple Object Access Protocol (SOAP), Extensible Markup Language-Remote Procedure Call (XML-RPC), JavaScript Object Notation (JSON), etc.).

At block 301, the personal computing device 104 creates a new device replica 202. Initially, the new replica 202 may be empty when created (i.e., contain no application data changes). The new replica 202 may be created on one or more volatile or non-volatile data storage media devices of the personal computing device 104 of, or operatively coupled thereto. In some embodiments, the new replica 202 is created by a web application using the HTML5 local storage capability of a web browser executing the web application.

As part of creating (block 301) the new replica 202, the personal computing device 104 assigns the new replica 202 as an initial replica identifier. The initial replica identifier may be stored as metadata of the new device replica 202. Preferably, the initial replica identifier assigned by the personal computing device 104 requires fewer than sixteen (16) bytes to represent. For example, the initial replica identifier may be a single byte or small multi-byte value representing a small ordinal value such as zero (0) or one (1), or a randomly selected value within a small numerical range. It should be understood, however, that the personal computing device 104 can assign an initial replica identifier that requires sixteen (16) or more bytes to represent and the invention is not limited to only replica identifiers that can be represented in fewer than sixteen (16) bytes. It is not required in any case, however, that the personal computing device 104 assigns the new replica 202 a unique replica identifier. Thus, beneficially, the personal computing device 104 can generate and assign an initial replica identifier to the new replica 202 without having to communicate or co-ordinate with other personal computing devices 104 or the replication service 103.

At block 303, the personal computing device 104 optionally makes one or more application data changes to the new replica 202 in form of creating, modifying, or deleting one or more change units in the new replica 202. Whenever a change unit is created or modified in the new replica 202, the change unit is assigned a new version in the form of a generated change stamp that includes the initial replica identifier. The change stamp is stored in the new replica 202 in association with the new version of the change unit. Change units, and/or an attribute or attributes and/or data object or data objects thereof, may also be associated with an update timestamp, separate from the change stamp, to reflect a clock time at which the change occurred. Alternatively, the clock time at which the change occurred can be encoded as part of the change stamp. For example, the replica-specific counter portion of the change stamp may include a system clock time since an epoch.

At block 305, the personal computing device 104 initiates a replication exchange with the replication service 103 by sending one or more messages 307 to the replication service 103. The message(s) 307 include the unique identifier of the shared data store, an identifier of the personal computing device 104, the current replica version vector associated with the new replica 202, and the initial replica identifier. The device identifier can be any data that uniquely identifies the personal computing device 104. The replication service 103 uses the device identifier at block 310 to determine whether a new replica identifier needs to be assigned to the new replica 202.

At block 308, the replication service 103 receives the network message(s) 307 sent from the personal computing device 104. Responsive to receiving the network messages(s) 307, the replication service 103 at block 310 determines whether the new device replica 202 can use the initial replica identifier as its final replica identifier, or whether the new device replica 202 needs to be assigned a new replica identifier. To make this determination, the replication service 103 maintains replica assignment data that associates, for a particular shared data store 200, final replica identifiers of the device replicas 201 of the particular shared data store 200 that the replication service 103 knows about and device identifiers of the personal computing devices 104 that joined the known device replicas 201 to the shared data store 200 by successfully completing a replication exchange with the replication service 103. Using the shared data store identifier and the initial replica identifier as keys into the replica assignment data, the replication service 103 at block 310 determines if a device identifier is already associated with the shared data store identifier and initial replica identifier combination.

If the a device identifier is already associated with the shared data store identifier and initial replica identifier combination, then another personal computing device 104 is already using the initial replica identifier as a final replica identifier for another device replica of the shared data store 200. In this case, the new device replica 202 is assigned (block 312) a new replica identifier by the replication service that does not conflict with any existing replica identifiers of the shared data store 200. Accordingly, the replication service 103 assigns (block 312) the new replica 202 a new replica identifier that is different from the initial replica identifier conveyed in the message(s) 307 and that, according to the replica assignment data, does not conflict with any other replica identifier of the shared data store 200.

At block 314, the replication service 103 records the final replica identifier assigned to the new device replica 202 in the replica assignment data. The final replica identifier is either the new replica identifier assigned at block 312, if the initial replica identifier conflicted with an existing replica identifier as detected at block 310, or is the initial replica identifier, if the initial replica identifier did not conflict with an existing replica identifier. Recording (block 314) the final replica identifier of the new device replica 202 includes updating the replica assignment data maintained by the replication service 103 so that the shared data store identifier and final replica identifier combination is associated with the device identifier of the personal computing device 104 conveyed in message(s) 307. The replica assignment data can be structured according to any suitable data structure such as a table or associative array, as non-limiting examples. In one embodiment, the replica assignment data is structured to optimize lookup of a device identifier given a shared data store identifier and replica identifier combination, as lookups would be expected to occur much more frequently than updates to the replica assignment data.

At block 316, the replication service 103 sends one or more network message(s) 318 that contain the final replica identifier assigned to the new replica 202 as recorded by the replication service 103 at bock 314. In addition, prior to sending the network message(s) 318, the replication service 103 can determine based on the new replica 202's version vector conveyed in message(s) 307 and the replica version vector associated with the service replica 201, whether the new device replica 202 has application data changes that the service replica 201 does not know about. This determination can be made by comparing the new replica 20's version vector conveyed in message(s) 307 to the replica version vector associated with the service replica 201, according to know version vector arithmetic. In the case where the new replica 202 has changes the service replica 201 does not know about, the message(s) 312 sent from the replication service 103 may also include the service replica 201's version vector. On the other hand, the replication service 103 can omit the service replica 201's version vector from the message(s) 318 if the replication service 103 determines that the service replica 201 is up-to-date with respect to the new replica 202. This would be the case, for example, if the personal computing device 104 did not make any changes to the new replica 202 at block 303 before initiating the replication exchange at block 305.

The personal computing device 104 receives (block 319) the message(s) 318 sent from the replication service 103. At block 321, the personal computing device 104 determines whether existing change stamps in the new replica 202 need to be updated with the final replica identifier sent in the message(s) 318. The change stamps will need to be updated if the final replica identifier sent in the message(s) 318 differs from the initial replica identifier assigned to the new replica 202 at block 301. In other words, the change stamps in the new replica 202 will need to be updated if the replication service 103 assigned the new replica 202 a new replica identifier at block 312 because the replication service 103 detected at block 310 that the initial replica identifier conflicted with a final replica identifier of another replica 202 of the shared data store 200.

If the change stamps of the new replica 202 need to be updated, this is done at block 323. In particular, the personal computing device 104 enumerates over all existing change stamps stored in the new replica 202 at the time the operation of block 323 is initiated. For each enumerated change stamp in the new replica 202, the initial replica identifier in the change stamp is replaced with the final replica identifier received in the message(s) 318. The resulting modified change stamp is stored back in the new replica 202 in association with the change unit it versions. As each change unit is associated with a change stamp in a replica 202, the computational complexity of this operation is approximated to be on the order of the number of change units stored in the new replica 202 at the time the operation of block 323 is initiated (i.e., the number of change units stored in the new replica 202 after block 303). The replication exchange then proceeds to block 325.

On the other hand, if the final replica identifier received in the acknowledgement message(s) 318 is the same as the initial replica identifier assigned to the new replica 202 by the personal computing device 104 at block 301, then the existing change stamps in the new replica 202 do not need to be updated and the replication exchange proceeds to block 325 without updating any change stamps in the new replica 202. Thus, the update operation at block 323 need only occur if the replication service 103 assigns the new replica 202 a new replica identifier as indicated in the message(s) 318.

At block 325, the personal computing device 104 determines whether application data changes to the new replica 202 are to be shared with the replication service 103. The replication service 103 can expressly request that the personal computing device 104 share application data changes in the message(s) 318 in response to the replication service 103 determining, based on the new replica's 202 version vector and the service replica 201's version vector, that the new replica 202 has application data changes that the service replica 201 does not know about. This request of the personal computing device 104 to share application data changes can be indicated by the replication service 103 in the message(s) 318 simply by including the service replica's 201 version vector in the message(s) 318. Other manners of requesting the personal computing device 104 to send application data changes are possible such as an explicit request bit or flag in the message(s) 318.

As an alternative to the replication service 103 requesting the personal computing device 104 to send application data changes, the personal computing device 104 can determine, based on the new replica 202's current version vector and the service replica 201's version vector conveyed in the message(s) 318, whether the new replica 202 has application data changes that the service replica 201 does not know about. In this case, the replication service 103 includes the service replica 201's version vector in the message(s) 318, not as a request of the personal computing device 104 to send application data changes from the new replica 202, but instead, so that the personal computing device 104 can determine whether application data changes from the new replica 202 should be sent to the replication service 103.

In response to determining (block 325) that application data changes from the new replica 202 should be sent to the replication service 103, the personal computing device 104 returns one or more change message(s) 327 containing the change units of the new replica 202 whose stored versions are unknown to the service replica 201. This set of change units can be determined by the personal computing device 104 using the service replica 201's version vector conveyed in the message(s) 318. A separate change message 327 may be sent for each change unit. Alternatively, multiple change units can be packaged into a single change message 327. A change message 327 includes the contents of the change unit as stored in the new replica 202, as well as the change unit's identifier (which may be a change stamp or other identifier), version vector, and update timestamp as stored in the new replica 202.

Change message(s) 327 received (block 330) by the replication service 103 are applied (block 332) to the service replica 201. If a concurrency conflict is detected between a change unit conveyed in a change message 327 and the corresponding change unit stored in the service replica 201, then the replication service 103 automatically resolves the concurrency conflict under a last writer wins policy. In particular, between the two conflicting change units, the change unit that is retained or stored in the service replica 201 is the change unit associated with the update timestamp that is earlier in time than the other update timestamp. When applying the change units received in the change message(s) 327 to the service replica 201, the replication service 103 updates the service replica 201's version vector to reflect that the service replica 201 now "knows" about the change units sent from the new replica 202.

After the replication service 103 has applied the change message(s) 327 to the service replica 201 and automatically resolved any concurrency conflicts, the replication service 103 sends (block 334) one or more acknowledgement message(s) 336 to the personal computing device 104. The acknowledgement message(s) 336 include the up-to-date version vector of the service replica 201 (i.e., the service replica 201's version vector after applying the change units received from the personal computing device 104 at block 332).

At block 337, the personal computing device 104 receives the message(s) 336 containing the service replica's 201 current version vector. At block 339, the personal computing device 104 compares the new device replica 202's current version vector with the service replica's 201 current version vector to determine whether the service replica 201 has application data changes that the new device replica 202 does not know about. This would be the case, for example, if the replication service 103 applied the results of a concurrency conflict resolution to the service replica 202 at block 332. This would also be the case if the service replica 202 had applied application data changes to the shared data store 200 received from other personal computing devices 104 that already joined a device replica 202 to the shared data store 200 prior to the initiation of the replication exchange by the current personal computing device 104 at block 305.

If, at block 339, the personal computing device 104 determines that the service replica 201 contains application data changes that the new device replica 202 does not know about, the personal computing device 104 requests (block 341) those changes by sending one or more change request message(s) 341. The change request message(s) 341 contain the new device replica's 202 current version vector.

If, on the other hand, at block 339, the personal computing device 104 determines that the new device replica 202 is up-to-date with respect the service replica 201, then the replication exchange ends at block 351.

At block 342, the replication service 103 receives the change request message(s) 341 if they were sent by the personal computing device 104 at block 341. At block 344, the replication service 103 uses the new device replica 202's current version vector conveyed in the change request message(s) 341 to determine the change units in the service replica 201 to share with the personal computing device 104 and those change units, along with associated versioning metadata from the service replica 201, are sent by the replication service 103 in one or more change message(s) 346 to the personal computing device 104. At block 349, the personal computing device 104 applies the change units received in the change message(s) 346 to the new device replica 202 including automatically resolving any concurrency conflicts based on a last writer wins policy as discussed above. The personal computing device 104 also update the new device replica's 202 version vector to reflect that the new device replica 202 knows about the change units applied at block 349. After applying the change units received in the change message(s) 346 and updating the new device replica's 202 version vector, the replication exchange ends 351.

On completion of the replication exchange, any existing application data changes made to the new device replica 202 before the replication exchange was initiated (block 305) have been shared with the replication service 103. In addition, any application data changes to the shared data store 200 that the replication service 103 was aware of at the time the replication service 103 received a change request from the personal computing device 104 at block 342 have been shared with the personal computing device 104. In addition, all non-conflicting application data changes that the personal computing device 104 shares (block 327) with the replication service 103 are incorporated (block 332) into the service replica 201 of the shared data store 200. Additionally, all non-conflicting application data changes that the replication service 103 shares (block 344) with the personal computing device 104 are incorporated (block 349) into the new device replica 202. Further, all conflicting application data changes that the personal computing device 104 shares (block 327) with the replication service 103 are automatically resolved (block 332) by the replication service 103 and the results of the conflict resolutions stored (block 332) in the service replica 201. Further, all conflicting application data changes that the replication service 103 shares (block 344) with the personal computing device 104 are automatically resolved (block 349) by the personal computing device 104 and the results of the conflict resolutions incorporated (block 349) into the new device replica 202.

Implementation Mechanism

Figure 4:
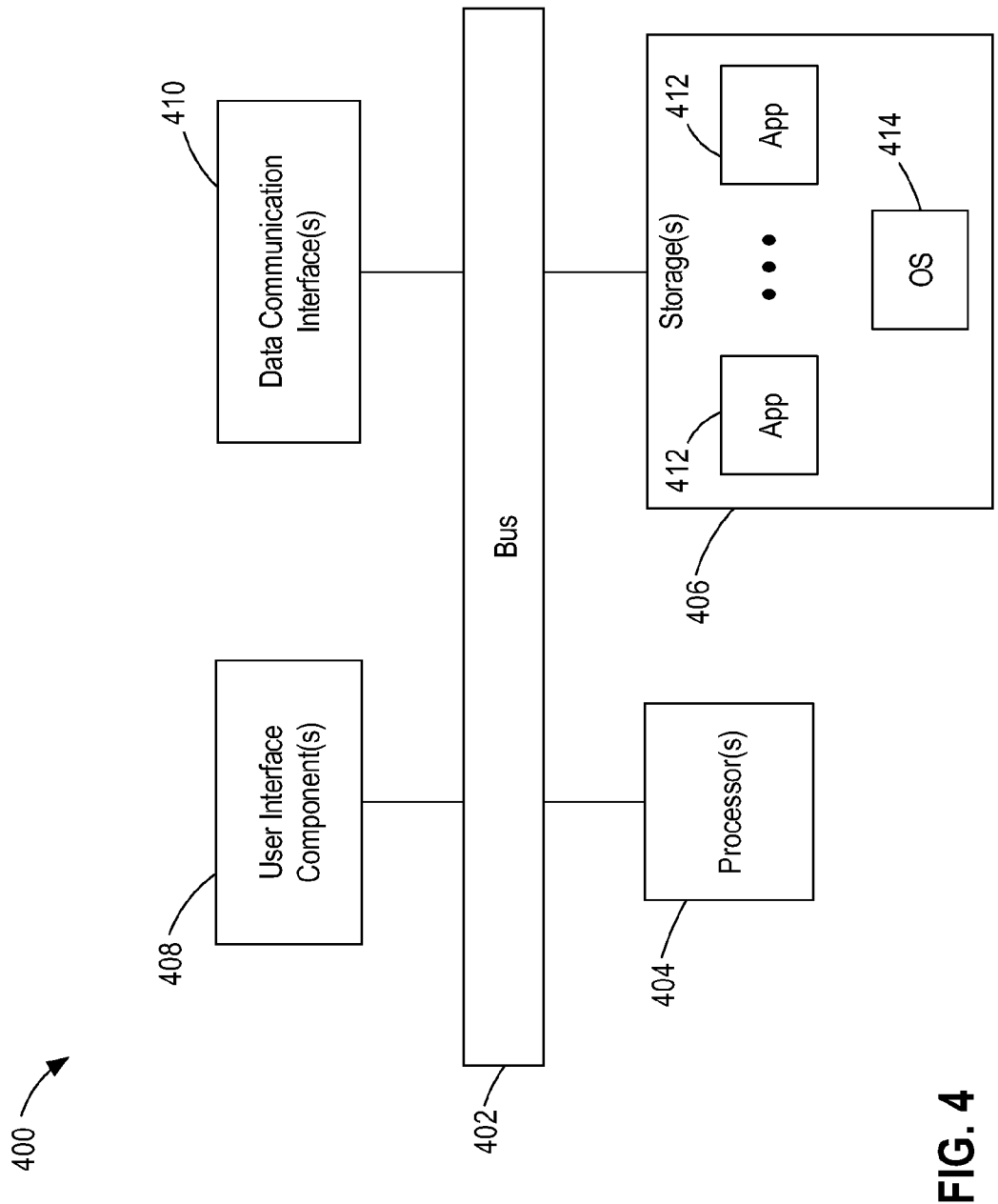
FIG. 4 is a block diagram that depicts a computing device upon which some embodiments of the invention may be implemented.

The techniques described herein may be implemented on one or more conventional or general-purpose computing devices. Non-limiting examples of a conventional or general-purpose computing device are a desktop/workstation computer, a laptop computer, a tablet computer, a smart phone, and a server computer. FIG. 4 is a block diagram showing various components of a computing device generally designated as 400.

A bus 402 facilitates information exchange between components connected to the bus 402. One or more processors 404 coupled to the bus 402 execute instructions and process information. One or more storages 406 (also referred to herein as non-transitory computer-readable media) are coupled to the bus 402. Storage(s) 406 may be used to store executable instructions, permanent data, and temporary data that are generated during instruction execution, and any other information needed to carry out computer processing. Executable instructions include binaries or other instructions executable by a machine, bytecode or other instructions executable by a software interpreter, and scripts or other human-readable instructions executable by a software interpreter.

Storage(s) 406 may include any and all types of storages that may be used to carry out computer processing. For example, storage(s) 406 may include main memory (e.g. random access memory (RAM) or other dynamic storage device), cache memory, read only memory (ROM), permanent storage (e.g. one or more magnetic disks or optical disks, flash storage, etc.), as well as other types of storage including external storage (e.g., network attached storage (NAS), direct-attached storage (DAS), storage area network (SAN), etc.) coupled to the device 400 via data communication interface(s) 410.

The various storages 406 may be volatile or non-volatile. Common forms of non-transitory computer-readable media include, for example, a floppy disk, a flexible disk, hard disk, magnetic tape, or any other magnetic medium, a CD-ROM, DVD, or any other optical storage medium, punchcards, papertape, or any other physical medium with patterns of holes, a RAM, a PROM, an EPROM, a FLASH-EPROM or any other type of flash memory, any memory chip or cartridge, and any other storage medium from which a computer can read.

Storage(s) 406 store at least several sets of executable instructions, including an operating system 414 and one or more applications 412. The processor(s) 404 execute the operating system 414 to provide a platform on which other sets of software may operate, and execute the application(s) 412 to provide additional, specific functionality. Execution of the operating system 414 or the application(s) 412 by the processor(s) 404 may be indirect in the sense that executable instructions are executed by a software interpreter or software virtual machine which is executed by the processor(s) 404. Alternatively, the operating system 414 or the application(s) 412 may be directly executed by the processor(s) 404.

For purposes of the present invention, the application(s) 412 may be any type of application configured to carry out techniques disclosed herein. In one embodiment, the application(s) 412 and the operating system 414 cooperate to implement techniques described herein. That is, portion(s) of the techniques may be performed by the application(s) 412 and portion(s) may be performed by the operating system 414. It should be noted though that this is just one possible embodiment. As an alternative, all of the techniques may be performed by the operating system 414. As a further alternative, all of the techniques may be performed by the application(s) 412. All such possible implementations are within the scope of the present invention.

In the embodiment shown in FIG. 4, the processor(s) 404 and the executable instructions 414 and/or 412 may be thought of as forming a special-purpose computing device that implements the techniques described herein. In such an implementation, the processors(s) 404 may be thought of as being "configured" by the executable instructions 414 and/or 412 to carry out the techniques. This is just one possible implementation for the techniques.

As an alternative, the techniques may be hardware implemented using a device (e.g. a programmable logic array) having an array of elements, including logic elements, wherein the elements are programmed or configured to implement the techniques. As a further alternative, the techniques may be hardware implemented by way of another device such as an application specific integrated circuit (ASIC) having elements, including logic elements, that are constructed/configured to implement the techniques. Overall, the techniques may be hardware implemented using any number of devices with elements, including logic elements, which are constructed/configured to implement the techniques. These and other computer-based implementations of the techniques are possible. All such implementations are within the scope of the present invention.

The device 400 may further comprise one or more user interface components 408 coupled to the bus 402. These component(s) 408 enable the device 400 to receive input from and provide output to a user. On the input side, the user interface component(s) 408 may include input mechanism(s), for example, a keyboard/keypad having alphanumeric keys, a cursor control device (e.g. mouse, trackball, touchpad, etc.), a touch sensitive screen capable of receiving user input, a microphone for receiving audio input, etc. On the output side, the component(s) 408 may include a graphical interface (e.g. a graphics card) and an audio interface (e.g. sound card) for providing visual and audio content.

The user interface component(s) 408 may further include a display (in some embodiments, the display is a touch sensitive display) for presenting visual content.

In some embodiments, the operating system 414 and/or the application(s) 412 may provide a software user interface that takes advantage of and interacts with the user interface component(s) 408 to receive input from and provide output to a user. This software user interface may, for example, provide a menu that the user can navigate using one or more the user input devices mentioned above.

In addition to the components set forth above, the device 400 further comprises one or more data communication interfaces 410 coupled to the bus 402. These interfaces 410 enable the device 400 to communicate with other components. The communication interfaces 410 may include, for example, a network interface (wired or wireless) for enabling the device 400 to send messages to and receive messages from a data network. The communications interfaces 410 may further include a wireless interface (e.g. Bluetooth) for communicating wirelessly with nearby devices, and a wired interface (e.g., Universal Serial Bus) for direct coupling with a compatible local device. Furthermore, the communications interfaces 410 may include a mobile wireless network interface (e.g., 3G or 4G) for enabling the device to access the Internet without using a local network. These and other interfaces may be included in the device 400.

Extensions and Alternatives

In the foregoing specification, embodiments of the present invention have been described with reference to numerous specific details that may vary from implementation to implementation. Thus, the sole and exclusive indicator of what is the invention, and is intended by Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method performed by one or more computing devices for joining a replica to a shared data store, the method comprising:
   receiving first information from a personal computing device;
   wherein the first information comprises an identifier of a shared data store and a first identifier of a replica, stored at the personal computing device, that is to be joined to the shared data store;
   responsive to receiving the first information, joining the replica to the shared data store;
   wherein joining the replica to the shared data store includes:
      based, at least in part, on the shared data store identifier and the first replica identifier received in the first information, determining whether the first replica identifier is already assigned to another known replica of the shared data store;
      responsive to determining that the first replica identifier is already assigned to another known replica of the shared data store:
         assigning a second replica identifier to the replica stored at the personal computing device that is not already assigned to any other known replica of the shared data store, and
         sending second information to the personal computing device, wherein the second information comprises the assigned second replica identifier;
   wherein after the personal computing device receives the second information, the personal computing device modifies the replica stored at the personal computing device by replacing the first replica identifier with the second replica identifier in a plurality of change stamps stored in the replica;
   wherein the first replica identifier is different from the second replica identifier.

2. The method of claim 1, wherein the first information is received in one or more network messages; and wherein the second information is sent in one or more network messages.

3. The method of claim 1, wherein assigning the second replica identifier to the replica stored at the personal computing device comprises consulting third information that indicates replica identifiers that are already assigned to known replicas of the shared data store, and selecting, as the second replica identifier, a replica identifier that, according to the third information, is not already assigned to a known replica of the shared data store.

4. The method of claim 1, wherein the first replica identifier is less than sixteen (16) bytes in length, and wherein the second replica identifier is less than sixteen (16) bytes in length.

5. The method of claim 1, further comprising:
responsive to sending the second information to the personal computing device, receiving fourth information from the personal computing device, wherein the fourth information comprises a plurality of change stamps associated with changes to the replica stored at the personal computing device, each change stamp of the plurality of change stamps received in the fourth information comprising the second replica identifier.

6. One or more non-transitory computer-readable media storing instructions which, when executed by one or more computing devices, cause the one or more computing devices to perform the method of claim 1.

7. One or more non-transitory computer-readable media storing instructions which, when executed by one or more computing devices, cause the one or more computing devices to perform the method of claim 2.

8. One or more non-transitory computer-readable media storing instructions which, when executed by one or more computing devices, cause the one or more computing devices to perform the method of claim 3.

9. One or more non-transitory computer-readable media storing instructions which, when executed by one or more computing devices, cause the one or more computing devices to perform the method of claim 4.

10. One or more non-transitory computer-readable media storing instructions which, when executed by one or more computing devices, cause the one or more computing devices to perform the method of claim 5.

11. A method performed by a personal computing device for joining a replica to a shared data store, the method comprising:
sending first information to a data replication service;
wherein the first information comprises an identifier of a shared data store and a first identifier of a replica of the shared data store, the replica stored at the personal computing device;
receiving second information from the data replication service;
wherein the second information comprises a second replica identifier;
responsive to receiving the second information, modifying the replica stored at the personal computing device by replacing the first replica identifier with the second replica identifier in a plurality of change stamps stored in the replica;
wherein the first replica identifier is different from the second replica identifier;
wherein the data replication service, responsive to receiving the first information, is configured to join the replica to the shared data store including performing:
determining whether the first replica identifier is already assigned to another known replica of the shared data store, based at least in part on the shared data store identifier and the first replica identifier received in the first information,
assigning the second replica identifier to the replica stored at the personal computing device that is not already assigned to any other known replica of the shared data store, responsive to determining the first replica identifier is already assigned to another replica of the shared data store, and
sending the second information to the personal computing device.

12. The method of claim 11, wherein the first information is sent in one or more network messages; and wherein the second information is received in one or more network messages.

13. The method of claim 11, further comprising:
prior to sending the first information, assigning the first replica identifier to the replica, and storing a plurality of change stamps in the replica in association with application data changes to the replica, each change stamp of the plurality of change stamps stored in the replica prior to sending the first information comprising the first replica identifier.

14. The method of claim 11, wherein the first replica identifier is less than sixteen (16) bytes in length, and wherein the second replica identifier is less than sixteen (16) bytes in length.

15. The method of claim 11, further comprising:
after replacing the first replica identifier in the plurality of change stamps with the second replica identifier, sending third information to the data replication service, wherein the third information comprises a plurality of change stamps in which each change stamp of the plurality of change stamps sent in the third information comprises the second replica identifier.

16. One or more non-transitory computer-readable media storing instructions which, when executed by a personal computing device, cause the personal computing device to perform the method of claim 11.

17. One or more non-transitory computer-readable media storing instructions which, when executed by a personal computing device, cause the personal computing device to perform the method of claim 12.

18. One or more non-transitory computer-readable media storing instructions which, when executed by a personal computing device, cause the personal computing device to perform the method of claim 13.

19. One or more non-transitory computer-readable media storing instructions which, when executed by a personal computing device, cause the personal computing device to perform the method of claim 14.

20. One or more non-transitory computer-readable media storing instructions which, when executed by a personal computing device, cause the personal computing device to perform the method of claim 15.

21. A system comprising:
a personal computing device;
a data replication service;
a device replica stored at the personal computing device; and
the personal computing device configured with instructions which, when executed by the personal computing device, cause the personal computing device to perform a method comprising:
sending first information to the data replication service;
wherein the first information comprises an identifier of a shared data store and a first identifier of the device replica;
receiving second information from the data replication service;
wherein the second information comprises a second replica identifier;
responsive to receiving the second information, modifying the device replica by replacing the first replica identifier with the second replica identifier in a plurality of change stamps stored in the device replica;
wherein the first replica identifier is different from the second replica identifier;

the data replication service configured with instructions which, when executed by the data replication service, cause the data replication service to perform a method comprising:

receiving the first information from the personal computing device;

responsive to receiving the first information, determining, based at least in part on the shared data store identifier and the first replica identifier received in the first information, whether the first replica identifier is already assigned to another known replica of the shared data store;

responsive to determining that the first replica identifier is already assigned to another known replica of the shared data store, assigning a second replica identifier to the device replica that is not already assigned to any other known replica of the shared data store, and sending the second information to the personal computing device.

22. The system of claim 21, wherein the first information is sent by the personal computing device in one or more network messages; and wherein the second information is sent by the data replication service in one or more network messages.

23. The system of claim 21, wherein the first replica identifier is less than sixteen (16) bytes in length, and wherein the second replica identifier is less than sixteen (16) bytes in length.

24. The system of claim 21, wherein each of the plurality of change stamps comprises a replica identifier component and a logical clock component; and wherein replacing the first replica identifier in the plurality of change stamps stored in the device replica with the second replica identifier comprises replacing the replica identifier component in each of the plurality of change stamps with the second replica identifier.

25. The system of claim 21, wherein the first information further comprises an identifier of the personal computing devices; and wherein assigning the second replica identifier to the device replica comprises recording an association between the shared data store identifier, the identifier of the personal computing device, and the second replica identifier.

26. The system of claim 21, wherein the instructions that the personal computing device is configured with comprise JavaScript instructions.

27. The system of claim 21, the method performed by the personal computing device further comprising:

after replacing the first replica identifier in the plurality of change stamps with the second replica identifier, sending third information to the data replication service, wherein the third information comprises the plurality of change stamps in which each change stamp of the plurality of change stamps sent in the third information comprises the second replica identifier.

28. The system of claim 21, the method performed by the personal computing device further comprising:

prior to sending the first information, assigning the first replica identifier to the device replica without needing to communicate with the data replication service, and storing the plurality of change stamps in the device replica in association with application data changes to the device replica, each change stamp of the plurality of change stamps stored in the device replica prior to sending the first information comprising the first replica identifier.

29. The system of claim 21, wherein the data replication service is hosted in virtualized server environment.

* * * * *